Aug. 3, 1926.

W. E. SPINDLER

SPOUTED UTENSIL

Filed July 26, 1922

1,594,640

Walter Edward Spindler
INVENTOR.

BY

Erwin, Wheeler & Woolard
ATTORNEYS.

Patented Aug. 3, 1926.

1,594,640

UNITED STATES PATENT OFFICE.

WALTER EDWARD SPINDLER, OF MANITOWOC, WISCONSIN.

SPOUTED UTENSIL.

Application filed July 26, 1922. Serial No. 577,569.

This invention relates to improvements in spouted utensils and methods for forming and attaching spouts.

It is the object of this invention to provide novel and simplified means for attaching a spout or lip to a utensil, such as a coffee or tea pot, whereby a liquid-tight joint between the spout and the body of the pot is more readily made than has hitherto been possible, and at the same time the marring of the pot is avoided. Such utensils are ordinarily polished prior to the attachment of the spout and where the spout is secured in place by such methods as have hitherto been known, it has generally been necessary to refinish those portions of the utensil adjacent the spout which had been marred by the attachment thereof.

It is a further important object of this invention to cut down the cost of manufacture of articles of this kind by eliminating as far as possible the manual labor which has hitherto been necessary in the assembly of utensils and their spouts.

In the drawings.

Like parts are identified by the same reference characters throughout the several views.

The utensil is represented at 5 and it will be understood that the utensil may be of any desired size or shape and adapted for any purpose or use. As illustrated, the utensil comprises a cylindrically curved surface such as is ordinarily found in a coffee or tea pot.

Figure 3:
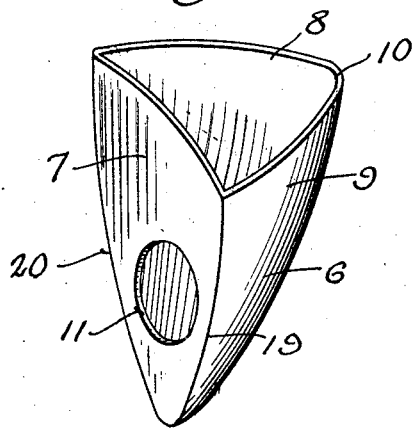
Fig. 3 is a perspective view of the spout prior to its attachment to the utensil.
Figure 4:
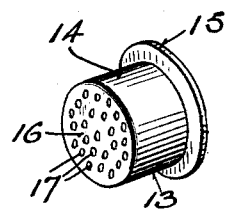
Fig. 4 is a perspective view of a novel form of rivet, the use of which is contemplated in connection with this invention.

The spout 6 is preferably constructed as shown in Fig. 3, and in reality constitutes a complete and separate utensil in itself. It is provided with an interior wall 7 adapted to fit closely against the utensil 5 and to conform thereto in shape. Thus, the wall 7 is preferably made concave in the present instance in order to conform to the convex exterior surface of utensil 5. Integral with wall 7 of the spout, are the walls 8 and 9 thereof which may be made convex to resemble the well known type of spout in general use. The walls 8 and 9 are so shaped as to form a lip 10 where their upper margins join to render the spout suitable for pouring.

The entire spout is preferably formed in one piece, but it will be understood that it may be assembled from two or more pieces, if desired. It is only essential that it be provided with a rear wall 7 or a sufficient portion thereof to form a setting for the rivet hereinafter to be described.

An aperture 11 of fairly large size is formed in the rear wall 7 of the spout, preferably in the lower portions thereof, as shown in Fig. 3. In order to cut the cost of manufacture to a minimum, it is preferred that this opening shall be round, but it will be obvious that openings of other shapes may be used in cases where it is expedient to make the shape of the opening conform to the shape of the spout. A second opening 12, similar in size and shape to the opening 11, is made in the utensil 5 and is so positioned therein that with the spout 6 in the desired position upon the utensil, the openings 11 and 12 will register.

For securing the spout to the utensil, I use a special rivet 13 provided with a body portion 14 conforming in size and shape to openings 11 and 12. In the present instance, the body portion is made cylindrical and its exterior diameter is equal to the diameter of the circular openings 11 and 12 in the utensil and the spout, respectively. A flange 15 upon the rivet is radially disposed at one extremity of the cylindrical body portion 14 and is adapted to contact with the margins of spout 6 adjacent to the opening 11 therein. The end of the cylindrical body portion 14 opposite to the flange 15 is closed by a foraminous head 16 which is preferably integral with the remainder of the rivet, but may be separately formed and attached thereto if desired. The openings 17 in the head 16 are of such sizes and are present in such numbers as to constitute an effective strainer adapted to retain within the utensil coffee grounds, tea leaves, and the like. It will be noted that only a single rivet is used and that all the openings 17 are formed therein prior to the insertion of the rivet into place in the utensil.

Figure 1:
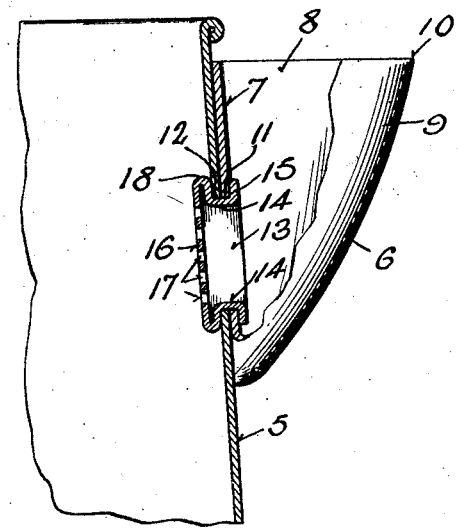
Fig. 1 is a vertical section taken centrally through a portion of a utensil and a spout attached thereto by the method and means hereinafter to be disclosed.
Figure 2:
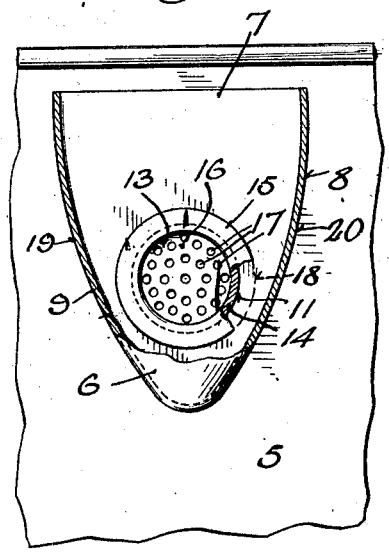
Fig. 2 is a section through the spout taken at right angles to the view shown in Fig. 1 and showing the portion of the utensil in elevation.

The rivet having been passed through openings 11 and 12 with the spout and the utensil in their desired relative positions, sufficient pressure is applied to the ends of the rivet to collapse the body portion 14 in the manner clearly shown in Fig. 1. The portion 18 of the body 14 forms an annular fold contacting with the inner surface of the utensil wall and cooperating with the rivet flange 15 to retain the spout 6 and utensil 5 in permanent association. The head 16 of the rivet is disposed close to the utensil wall and is well adapted to function as a strainer.

It will be noted that the manufacture of spouted utensils, according to the invention herein disclosed is greatly simplified. The utensil itself is formed as heretofore, but the spout, instead of having only walls 8 and 9, can be made in a single operation to constitute a complete utensil in itself, having walls enclosing it on all sides with the exception of its open top. It is important that the rear wall 7 of the spout conform to the exterior surface of the utensil as previously claimed. The registering openings 11 and 12 in the spout and utensil prepare them for their subsequent association by rivet 13.

The rivet is separately formed and can readily be made complete from one piece of any ductile metal, such as aluminum, in a single operation. The fact that the head 16 is rendered foraminous prior to the insertion of the rivet into the utensil greatly facilitates the manufacture of this device because it would be difficult to make the openings 17 after the rivet had been compressed into place as shown in Fig. 1.

The device is completed by the insertion of rivet 13 either through the spout 6 to be clamped in place as shown in Fig. 1 or through the utensil, in which case, the position of fold 18 and flange 15 would be reversed. By this simple process, the spout is readily attached and inasmuch as all of the liquid passing therethrough reaches the spout through the attaching rivet, it is only necessary that the joint between the rivet flange 15 and the spout, and between the rivet fold 18 and the utensil be tight to ensure that there will be no leakage. Thus, in practicing my invention, it is not necessary that the margins 19 and 20 of the spout be brought into a liquid-tight relation to the utensil. Soldering at these points, is therefore, unnecessary and neither the finish of the utensil nor the finish of the spout will be injured in any way by the attaching process. Attention is called to the fact that dislocation of the spout relative to the utensil, about the rivet as a pivot point, is impossible due to the curvature of the utensil and the correspondingly shaped wall 7 of the spout. The conformity between these surfaces renders displacement of the spout impossible and the necessary conformity of the rivet itself to the curved surfaces referred to cooperates to that end.

The process and construction disclosed herein are particularly applicable to the manufacture of spouted utensils from aluminum, which is sufficiently ductile so that the spout and rivet can each be formed in one piece. Other ductile metals, such as copper, might be similarly used, and it is even possible to use iron where heat is employed during the shaping of the metal. Thus, it is thought that this invention will prove valuable, not only in the aluminum industry, but also in the manufacture of enameled ware goods where similar considerations make it necessary to avoid the marring of the pot or the spout during the attaching process. Where the spouted utensil is made from enameled iron or similar material, however, it will, of course, be desirable to use a rivet of ductile material which may be compressed by the application of pressure without heat in the manner heretofore discussed to bind the spout and utensil together without marring their surfaces.

I claim:

The combination with a cylindrically curved utensil wall, of a three-sided spout provided with a cylindrically curved rear wall conforming to the wall of the utensil, said rear wall and said utensil wall being provided with registering apertures, and a single tubular rivet provided with a foraminous head and compressed against the cylindrical wall of the utensil and against the correspondingly formed wall of the spout, whereby the margins of said walls adjacent the apertures therein are clamped together.

WALTER EDWARD SPINDLER.